United States Patent [19]

Takaki

[11] Patent Number: 5,757,850
[45] Date of Patent: May 26, 1998

[54] TRANSMISSION BIT RATE DISCRIMINATION METHOD AND APPARATUS

[75] Inventor: Tetsuya Takaki, Tokyo, Japan

[73] Assignee: NEC Corporation, Tokyo, Japan

[21] Appl. No.: 556,857

[22] Filed: Nov. 2, 1995

[30] Foreign Application Priority Data

Nov. 2, 1994  [JP]  Japan ................................. 6-291950

[51] Int. Cl.$^6$ ........................................................ H04B 3/46
[52] U.S. Cl. ........................................................ 375/225
[58] Field of Search ............................. 375/225, 209, 375/210, 359; 370/84

[56] References Cited

U.S. PATENT DOCUMENTS

| | | | |
|---|---|---|---|
| 5,177,740 | 1/1993 | Toy et al. | 370/337 |
| 5,504,773 | 4/1996 | Padovani et al. | 375/200 |
| 5,566,206 | 10/1996 | Butler et al. | 375/225 |

OTHER PUBLICATIONS

J.K. Hinderling, et al., "CDMA Mobile Station Modem ASIC", IEEE Journal of Solid–State Circuits, vol. 28, No. 3, Mar. 1993, pp. 253–260.

*Primary Examiner*—Stephen Chin
*Assistant Examiner*—Kevim Kim
*Attorney, Agent, or Firm*—Ostrolenk, Faber, Gerb & Soffen, LLP

[57] ABSTRACT

The invention provides a transmission bit rate discrimination method and apparatus wherein, when a base station in a mobile communication which makes use of spectrum spreading performs transmission at a variable bit rate using four different transmission bit rates and repetitively transmits transmission symbols of a low transmission bit rate, a mobile station detects a rate of repetitions of received symbols and discriminates the transmission bit rate of received data simply. A received symbol sequence for one frame is inputted to shifters for shifting the received symbol sequence by one, three and seven symbol distances, respectively, and a correlation calculator for calculating an auto-correlation. The outputs of the shifters are inputted to correlation calculators for calculating cross-correlations, and results of the correlation calculations are inputted to a comparator, by which they are compared with reference to a result of the auto-correlation calculation to discriminate the transmission bit rate. A switch is switched in response to the discriminated transmission bit rate so that the received symbol sequence is sent out to one of Viterbi decoders which corresponds to the transmission bit rate.

3 Claims, 3 Drawing Sheets

TRANSMISSION BIT RATE DISCRIMINATION METHOD AND APPARATUS

BACKGROUND OF THE INVENTION

1. Field of the Invention

This invention relates to a method of and apparatus for discriminating a transmission bit rate, and more particularly to a transmission bit rate discrimination method and apparatus for a mobile communication system (TIA•IS-95) wherein spectrum spreading which was standardized in the North America in July, 1993 is employed to perform transmission at a variable bit rate.

2. Description of the Related Art

Generally, in a mobile communication which employs spectrum spreading, when a base station communicates with a mobile station, it performs signal processing such as error correction and block interleaving of a signal such as speech or data to be transmitted and then performs modulation of the signal using PSK (Phase Shift Keying) or the like, whereafter it spreads the spectrum in a wide bandwidth using a code such as a PN (Pseudo Noise) spread signal (pseudonoise spread signal) and transmits the signal of the spread spectrum.

In the mobile station, a received signal is despread using a PN code sequence same as and synchronized with that used in the base station and is then demodulated to a signal of a base band, and the base band signal is processed by signal processing such as error correction and deinterleaving to extract an original signal of speech, data or the like.

In the TIA•IS-95, when a base station communicates with a mobile station, such signal processing as illustrated in FIG. 3 is first performed in a traffic channel, and then spreading of the spectrum and modulation of the signal are performed and a resulted signal is transmitted.

Referring to FIG. 3, the base station of the TIA•IS-95 realizes a variable bit rate using four different transmission bit rates of 9.6 Kbps, 4.8 Kbps, 2.4 Kbps and 1.2 Kbps for data to be transmitted in a traffic channel (301). Then, the base station adds information, which is to be used to detect an error of received data after the mobile station receives the data, to transmission data such as speech (302) and then produces transmission frames (303). Thereafter, the base station performs convolutional encoding for error correction for each of the transmission frames (304) and transmits transmission symbols repetitively in accordance with the transmission bit rate (305).

In this instance, the rate of repetitions of transmission symbols increases as the transmission bit rate decreases, and the repetition rate is zero at 9.6 Kbps, two at 4.8 Kbps, four at 2.4 Kbps and eight at 1.2 Kbps.

Thereafter, the base station performs block interleaving processing (306) and generates a long code by means of a 42-b PN code generator (3010), whereafter it scrambles the transmission data (307) using a first decimator (3011). Further, the base station inserts information for power control into the transmission data (308) using a second decimator (3012) and spreads the spectrum of the transmission data in a wide bandwidth, and modulates the transmission data (309). Then, the base station transmits the modulated transmission data.

In the mobile communication system which employs such spectrum spreading as described above, the transmission bit rate is discriminated by various methods in the mobile station. According to one method, the mobile station demodulates received data, despreads the demodulated data using a code same as and synchronized with the code for spectrum spreading used by the base station, descrambles the despread data, block interleaves the descrambled data to vary the order of the received data, performs Viterbi decoding corresponding to the four transmission bit rates, re-encodes results of the decoding using a convolution encoder same as that of the base station, compares the re-encoded data with the data before the Viterbi decoding to detect correlations between them, and discriminates one of the results of the decoding which exhibits a maximum correlation as the data transmitted to the mobile station and discriminates the transmission bit rate from the discriminated transmission data. According to another method, after the Viterbi decoding in the former method, the received data are compared with encoded data which can be generated from convolutional encoder to obtain path metrics which are sum totals of errors, and the path metrics are compared with each other. Then, one of the results of the decoding which exhibits a minimum path metric is discriminated as maximum decoded data, and the transmission bit rate is discriminated from the maximum decoded data.

When it is tried to discriminate a transmission bit rate using any of the conventional methods described above, Viterbi decoding must be performed for the four different transmission bit rates. Further, it is required to re-encode the decoded data, compare the re-encoded data with the respective received data before the Viterbi decoding to detect correlations between them and compare the correlations with each other to discriminate the transmission bit rate. From the two reasons, much time is required for the processing and a large circuit scale is required for the apparatus.

SUMMARY OF THE INVENTION

It is an object of the present invention to provide a transmission bit rate discrimination method and apparatus wherein, when a base station in a mobile communication which makes use of spectrum spreading performs transmission at a variable bit rate using four different transmission bit rates and repetitively transmits transmission symbols of a low transmission bit rate, a mobile station detects a rate of repetitions of received symbols and discriminates the transmission bit rate of received data simply.

In order to attain the object described above, according to an aspect of the present invention, there is provided a method of discriminating a transmission bit rate in a mobile communication system wherein a base station transmits data of a plurality of different bit rates repetitively in units of a symbol corresponding to each bit rate, comprising the steps of calculating, in a mobile station, for each of the plurality of bit rates, a cross-correlation between a received symbol sequence for one frame received by the mobile station and another symbol sequence obtained by shifting the received symbol sequence for one frame by a predetermined number of symbols including zero corresponding to the bit rate, and comparing a result of the cross-correlation calculation or each of the cross-correlation calculations with reference to a result of the auto-correlation calculation of the received symbol sequence for one frame to discriminate the bit rate.

With the transmission bit rate discrimination method, where the base station realizes a variable bit rate using four different transmission bit rates and repetitively transmits transmission symbols of a low transmission bit rate, the mobile station detects the rate of such repetitions using the results of the correlation calculations of received symbols to discriminate the transmission bit rate. Consequently, the processing time is reduced comparing with that of the prior art, and an increase in circuit scale of the bit rate discriminator can be prevented.

According to another aspect of the present invention, there is provided a transmission bit rate discrimination apparatus for a mobile communication system wherein a base station transmits data of a plurality of different bit rates repetitively in units of a symbol corresponding to each bit rate, comprising a plurality of shifters for shifting a received symbol sequence for one frame received by a mobile station individually by respective different predetermined numbers of symbols corresponding to the bit rates, an auto-correlation calculator for calculating an auto-correlation of the received symbol sequence for one frame, a plurality of cross-correlation calculators for individually calculating cross-correlations between outputs of the shifters and the received symbol sequence for one frame, a comparator for comparing results of the cross-correlation calculations from the cross-correlation calculators with reference to a result of the auto-correlation calculation from the auto-correlation calculator to discriminate a transmission bit rate, and switch means for selecting a route for the received symbol sequence in response to the discriminated transmission bit rate so that the received symbol sequence may be outputted to a Viterbi decoding section corresponding to the transmission bit rate.

With the transmission bit rate discrimination apparatus, where the base station realizes a variable bit rate using four different transmission bit rates and repetitively transmits transmission symbols of a low transmission bit rate, the mobile station detects the rate of such repetitions using the results of the correlation calculations of received symbols to discriminate the transmission bit rate. Consequently, significant reduction of the processing time is achieved while preventing an increase in circuit scale.

The above and other objects, features and advantages of the present invention will become apparent from the following description and the appended claims, taken in conjunction with the accompanying drawings.

DESCRIPTION OF THE PREFERRED EMBODIMENT

A transmission bit rate discrimination method according to the present invention is applied, in a preferred embodiment described below, to a mobile communication system which employs a spectrum spreading communication method. Here, it is assumed that a base station performs transmission at a variable bit rate using four different transmission bit rates of 9.6 Kbps, 4.8 Kbps, 2.4 Kbps and 1.2 Kbps on a traffic channel and repetitively transmits transmission data in accordance with a transmission bit rate in such a manner that transmission symbols are transmitted repetitively by no rate at the transmission bit rate of 9.6 Kbps, by two rates at 4.8 Kbps, by four rates at 2.4 Kbps and by eight rates at 1.2 Kbps. In this instance, an auto-correlation of a received symbol sequence for one frame received by a mobile station, a cross-correlation between the received symbol sequence for one frame and another symbol sequence obtained by shifting the received symbol sequence for one frame by a one symbol distance, another cross-correlation between the received symbol sequence for one frame and a further symbol sequence obtained by shifting the received symbol sequence for one frame by a three symbol distance, and a further cross-correlation between the received symbol sequence for one frame and a still further symbol sequence obtained by shifting the received symbol sequence for one frame by a seven symbol distance are calculated separately, and results of the calculations of cross-correlations are compared with reference to a result of the calculation of an auto-correlation to discriminate the transmission bit rate.

Figure 1:
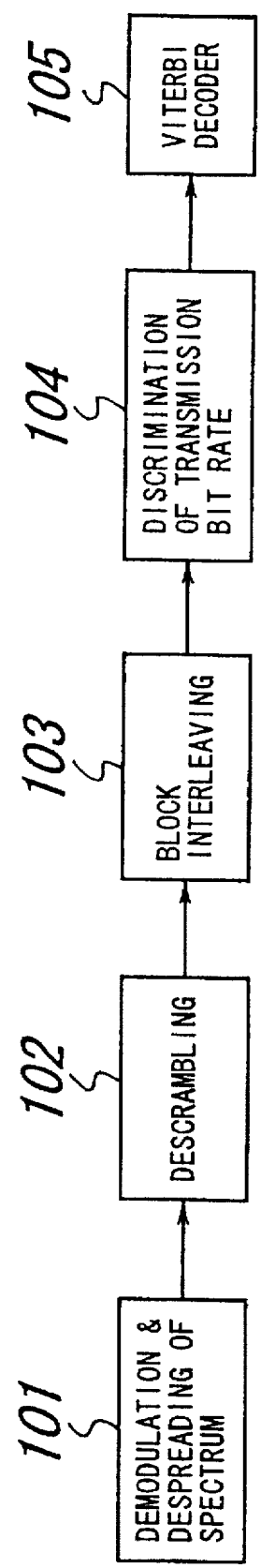
FIG. 1 is a flow diagram illustrating a flow of processes performed in a traffic channel by a mobile station according to the present invention.

The mobile station performs such a flow of processes as illustrated in FIG. 1 for data received thereby in a trafffice channel.

Referring to FIG. 1, the received data are first demodulated and despreading processing of the spectrum is performed using a PN code sequence for spreading same as and synchronized with that used in the base station (101). Then, a long code is generated using information for descrambling transmitted to the mobile station from the base station using a synchronization channel to descramble the demodulated and despread data (102). Thereafter, block interleaving is performed to restore the order of the received data sequence for one frame (103) and the transmission bit rate is discriminated using the method described hereinabove (104). Then, Viterbi decoding is performed in accordance with the thus discriminated transmission bit rate (105).

Figure 2:
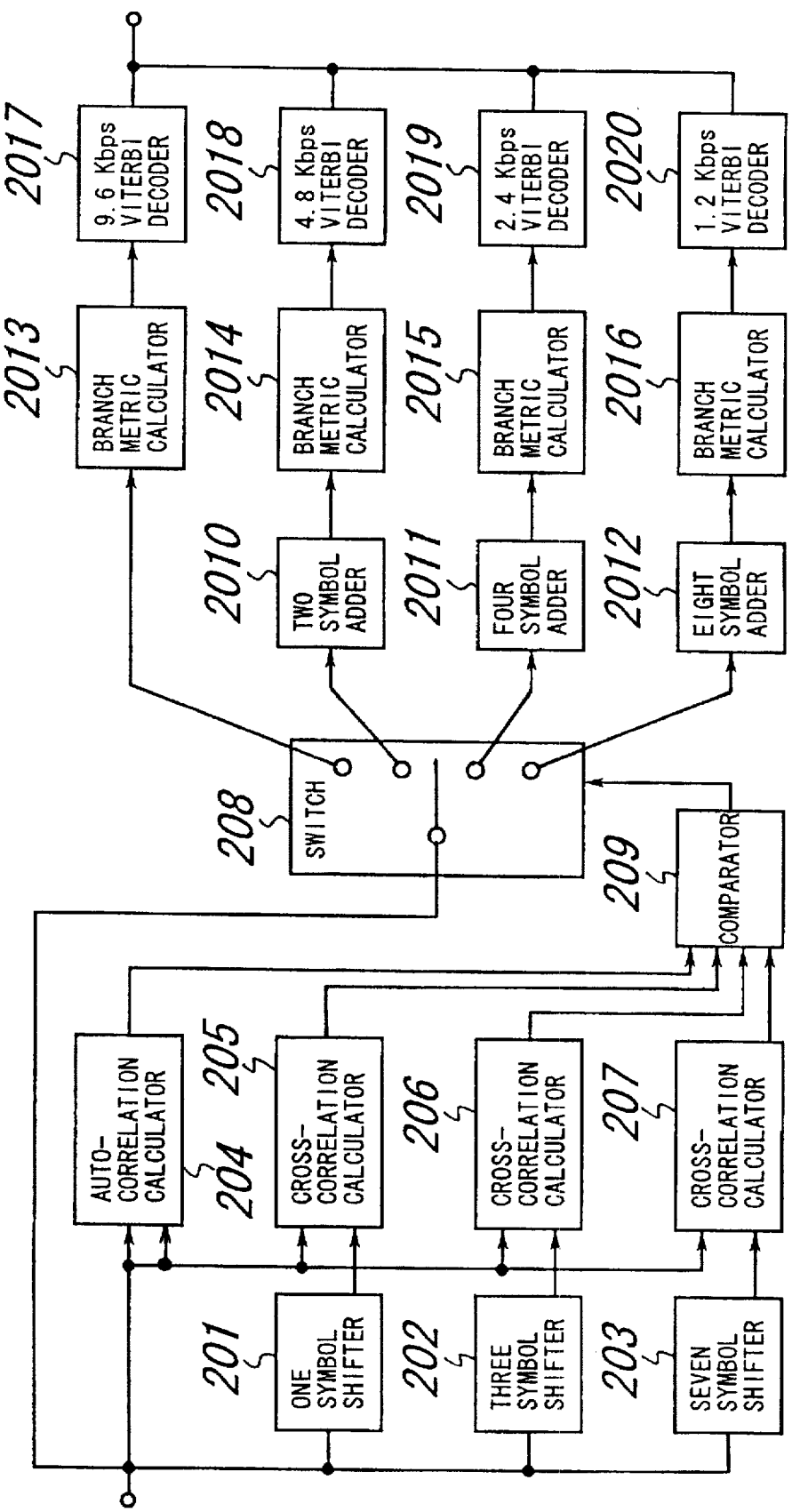
FIG. 2 is a block diagram of a Viterbi decoder and a circuit for discrimination of a transmission bit rate to which the present invention is applied.
Figure 3:
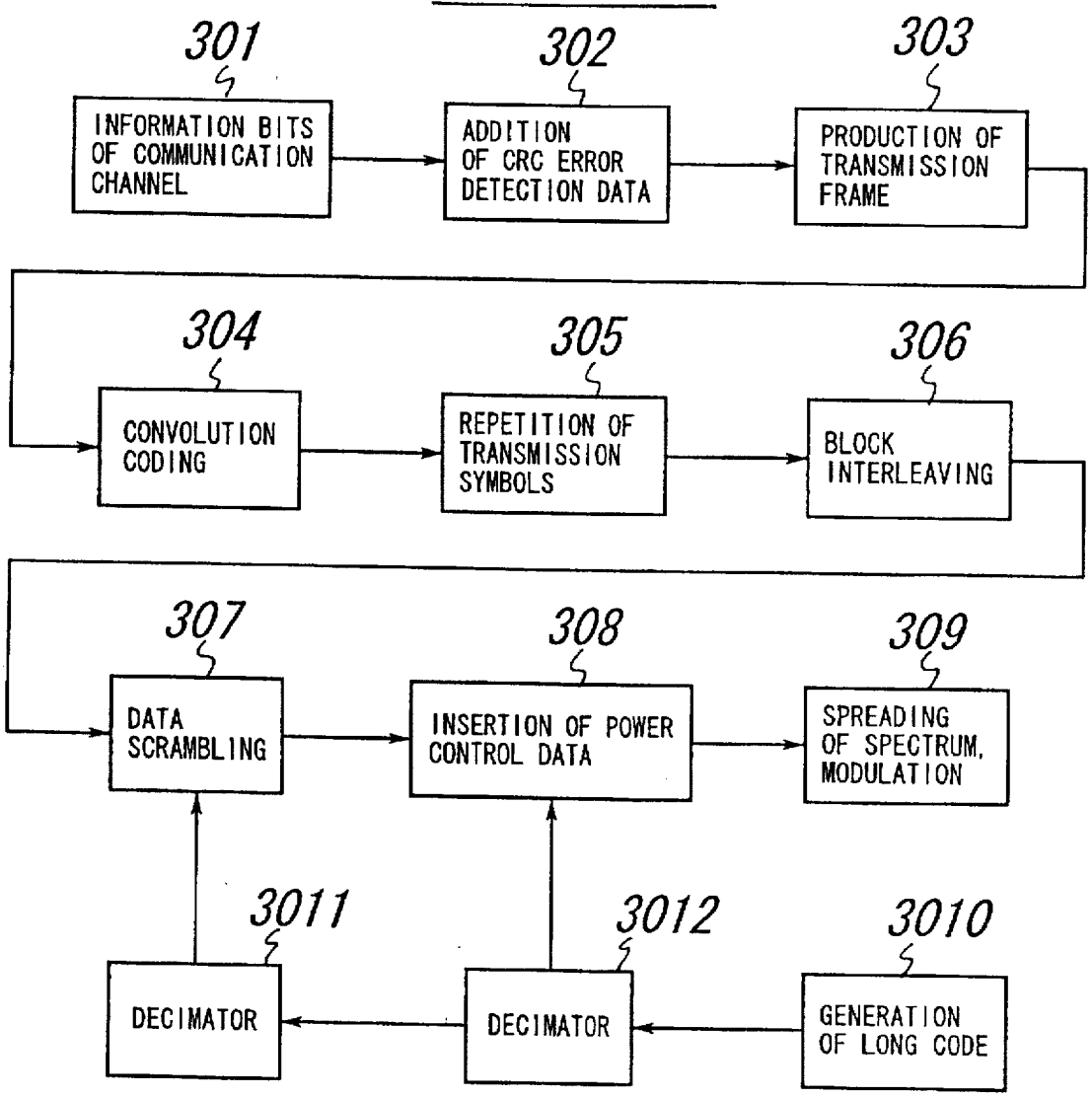
FIG. 3 is a flow diagram illustrating a flow of processes performed in a trafffic channel by a base station according to the TIA·IS-95.

In the embodiment of the present invention, the discrimination of the transmission bit rate (104) is performed and then Viterbi decoding is performed in accordance with the thus discriminated transmission bit rate using a circuit shown in FIG. 2.

Referring to FIG. 2, the circuit for discriminating the transmission bit rate includes a one symbol shifter 201 for shifting a received symbol sequence for one frame received by the mobile station by a one symbol distance, a three symbol shifter 202 for shifting the received symbol sequence for one frame by a three symbol distance, a seven symbol shifter 203 for shifting the received symbol sequence for one frame by a seven symbol distance, an auto-correlation calculator 204 for calculating an auto-correlation of the received symbol sequence for one frame, a cross-correlation calculator 205 for calculating a cross-correlation between the output of the one symbol shifter 201 and the received symbol sequence for one frame, another cross-correlation calculator 206 for calculating a cross-correlation between the output of the three symbol shifter 202 and the received symbol sequence for one frame, a further cross-correlation calculator 207 for calculating a cross-correlation between the output of the seven symbol shifter 203 and the received symbol sequence for one frame, a comparator 209 for comparing results of the correlation calculations of the cross-correlation calculators 205, 206 and 207 with reference to a result of the correlation calculation of the auto-correlation calculator 204, and a switch 208 for selecting a route for the received sequence for one frame in response to a result of the comparison of the comparator 209 so that the received sequence for one frame may be passed on to a next processing stage.

The circuit further includes a two symbol adder 2010 for adding a received symbol sequence for each two symbols from the top of the same, a four symbol adder 2011 for adding the received symbol sequence for each four symbols from the top of the same, an eight symbol adder 2012 for adding the received symbol sequence for each eight symbols from the top of the same, branch metric calculators 2013, 2014, 2015 and 2016 for calculating branch metrics for use for Viterbi decoding, and Viterbi decoders 2017, 2018, 2019 and 2020 provided corresponding to the individual transmission bit rates.

A received symbol sequence (refer to FIG. 1) to which the block interleaving processing (103) has been performed is inputted to the auto-correlation calculator 204 for calculating an auto-correlation, the one symbol shifter 201 for shifting the received symbol sequence by a one symbol distance, the three symbol shifter 202 for shifting the received symbol sequence by a three symbol distance, and the seven symbol shifter 203 for shifting the received symbol sequence by a seven symbol distance.

The outputs of the shifters 201 to 203 are inputted to the cross-correlation calculators 205, 206 and 207 for calculating cross-correlations thereof with the received symbol sequence for one frame. Consequently, correlation calculations of the individual symbol sequences originating from the received symbol sequence are performed by the cross-correlation calculators 205, 206 and 207.

Results of the individual correlation calculations are sent out to the comparator 209, by which they are compared with reference to a result of the auto-correlation calculation of the auto-correlation calculator 204 to discriminate the transmission bit rate. A result of the comparison is outputted to the switch 208. Consequently, the switch 208 is switched in response to the thus discriminated transmission bit rate.

Then, the received symbol sequence for one frame is sent out to the Viterbi decoder 105 by way of the switch 208.

In the Viterbi decoder 105, when the discriminated transmission bit rate is 9.6 Kbps, a branch metric for Viterbi decoding is calculated by the branch metric calculator 2013 and the received symbol sequence is decoded by the Viterbi decoder 2017 for 9.6 Kbps.

But when the discriminated transmission bit rate is 4.8 Kbps, the received symbol sequence for one frame is added for each two symbols from the top thereof by the two symbol adder 2010, and a branch metric for Viterbi decoding is calculated by the branch metric calculator 2014 and the received symbol sequence is decoded by the Viterbi decoder 2018 for 4.8 Kbps.

Or when the discriminated transmission bit rate is 2.4 Kbps, the received symbol sequence for one frame is added for each four symbols from the top thereof by the four symbol adder 2011, and a branch metric for Viterbi decoding is calculated by the branch metric calculator 2014 and the received symbol sequence is decoded by the Viterbi decoder 2019 for 2.4 Kbps.

Or else when the discriminated transmission bit rate is 1.2 Kbps, the received symbol sequence for one frame is added for each eight symbols from the top thereof by the eight symbol adder 2012, and a branch metric for Viterbi decoding is calculated by the branch metric calculator 2016 and the received symbol sequence is decoded by the viterbi decoder 2020 for 1.2 Kbps.

In the present embodiment, the results of the cross-correlation calculations are compared with reference to the result of the auto-correlation calculation of the auto-correlation calculator 204 to detect a repeat rate of received symbols. Then, in response to a result of the detection, the route to be used is switched by the switch 208 so that decoding processing is performed by a Viterbi decoder corresponding to the transmission bit rate. In other words, whereas, in the prior art, Viterbi decoding is performed for each of different bit rates to analyze information of path metrics or the like to discriminate the transmission bit rate, according to the present embodiment, the transmission bit rate can be discriminated before Viterbi decoding is performed. Consequently, it is unnecessary to perform Viterbi decoding for all of the four bit rates, and accordingly, reduction in processing time is achieved.

Having now fully described the invention, it will be apparent to one of ordinary skill in the art that many changes and modifications can be made thereto without departing from the spirit and scope of the invention as set forth herein.

What is claimed is:

1. A method of discriminating a transmission bit rate in a mobile communication system wherein a base station transmits data at a plurality of different bit rates, the data including repetitively transmitted units of a symbol corresponding to the bit rate of the transmission, the method comprising the steps of:

calculating, in a mobile station, for each of the plurality of bit rates, a cross-correlation between a received symbol sequence for one frame received by said mobile station and another symbol sequence obtained by shifting the received symbol sequence for one frame by a predetermined number of symbols including zero corresponding to the bit rate; and comparing a result of the cross-correlation calculation or each of the cross-correlation calculations with reference to a result of the auto-correlation calculation of the received symbol sequence for one frame to discriminate the bit rate.

2. A transmission bit rate discrimination apparatus for a mobile communication system wherein a base station transmits data at a plurality of different bit rates, the data including repetitively transmitted units of a symbol corresponding to the bit rate of the transmission, the apparatus comprising:

a plurality of shifters for shifting a received symbol sequence for one frame received by a mobile station individually by respective different predetermined numbers of symbols corresponding to the bit rates:

an auto-correlation calculator for calculating an auto-correlation of the received symbol sequence for one frame;

a plurality of cross-correlation calculators for individually calculating cross-correlations between outputs of said shifters and the received symbol sequence for one frame;

a comparator for comparing results of the cross-correlation calculations from said cross-correlation calculators with reference to a result of the auto-correlation calculation from said auto-correlation calculator to discriminate a transmission bit rate; and switch means for selecting a route for the received symbol sequence in response to the discriminated transmission bit rate so that the received symbol sequence may be outputted to a Viterbi decoding section corresponding to the transmission bit rate.

3. A transmission bit rate discrimination apparatus as claimed in claim 2, wherein the bit rates include four different bit rates of 9.6 Kbps, 4.8 Kbps, 2.4 Kbps and 1.2 Kbps, and said shifters include a one symbol shifter, a three symbol shifter and a seven symbol shifter.

* * * * *